UNITED STATES PATENT OFFICE.

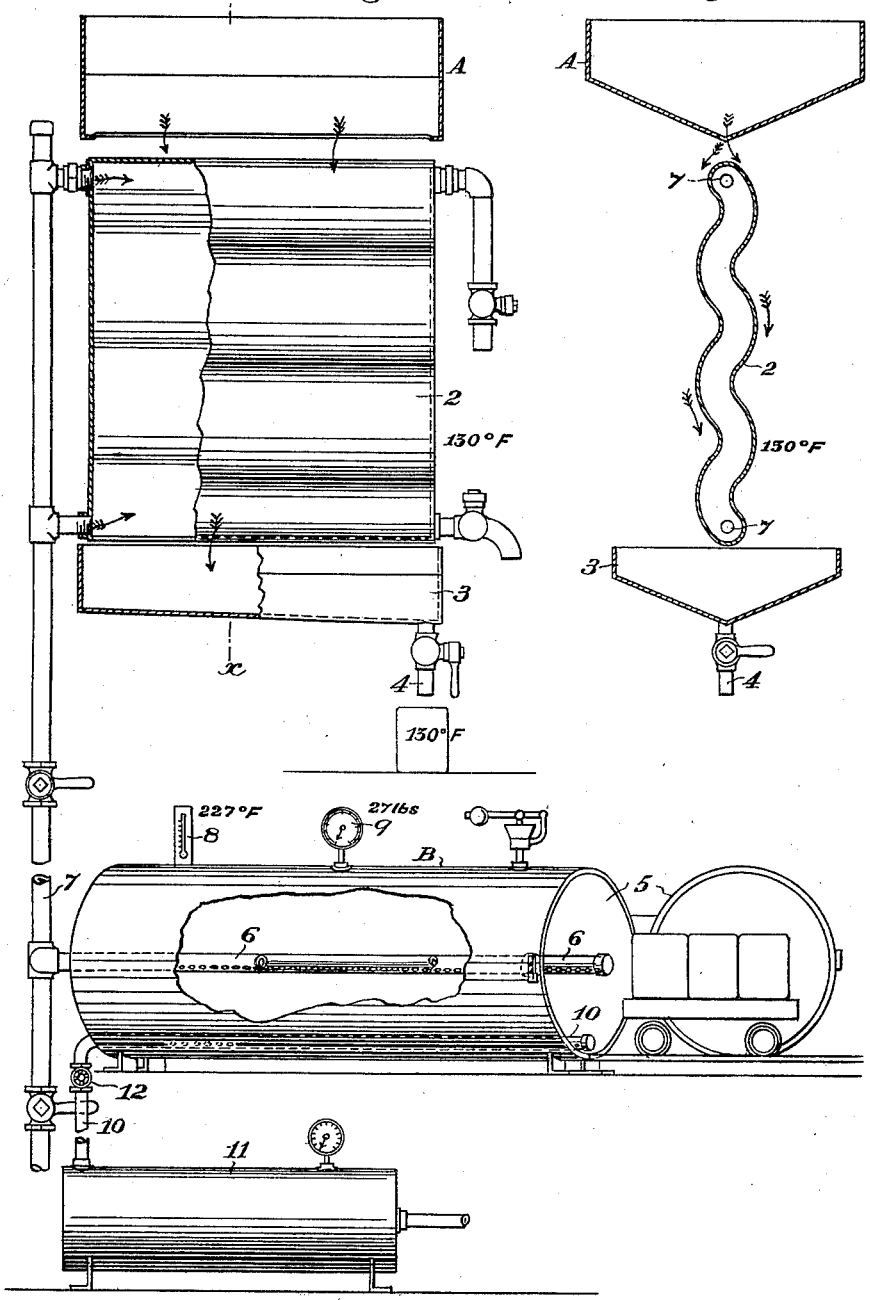

ALGERNON VICTOR RUSSELL, OF SAN FRANCISCO, CALIFORNIA.

PROCESS OF PRESERVING MILK OR CREAM.

SPECIFICATION forming part of Letters Patent No. 676,996, dated June 25, 1901.

Application filed December 4, 1900. Serial No. 38,675. (No specimens.)

*To all whom it may concern:*

Be it known that I, ALGERNON VICTOR RUSSELL, a citizen of the United States, residing in the city and county of San Francisco, State of California, have invented an Improvement in Processes of Preserving Milk or Cream; and I hereby declare the following to be a full, clear, and exact description of the same.

My invention relates to an improved process for preserving lacteal products, such as milk and cream.

It consists, essentially, of heating the milk or cream and sealing it under ordinary atmospheric pressure, subjecting the sealed product to a high degree of heat under pressure, then reducing the temperature and maintaining the pressure, and finally suddenly cooling at ordinary atmospheric pressure again, and of details more fully to be set forth in the following specification and accompanying drawings.

Figure 1 is part longitudinal elevation and section of the apparatus employed in the preserving process. Fig. 2 is a transverse section on the line *x x* of Fig. 1.

The object of my invention is to provide a means of preserving milk and cream so that it may be kept indefinitely without suffering any deterioration and at the same time retaining the natural sweetness and actual flavor of the original product.

The process consists of the following steps:

First. Heating the milk or cream in a receptacle or sterilizer under ordinary atmospheric pressure at a temperature of approximately 130° Fahrenheit, by which the milk or cream is deodorized and cleansed of impurities or germs.

Second. Running it into can or jars at the same temperature and sealing under ordinary atmospheric pressure. This degree of heat is sufficient to have practically excluded all the germs from the can.

Third. The sealed product placed in a chamber or retort, which latter is then hermetically closed. Steam is admitted to this retort and the temperature gradually increased till at the end of about fifteen minutes it is approximately 227° Fahrenheit. A pressure of twenty-seven pounds is then attained therein, and this pressure and temperature are maintained for approximately twenty minutes longer. This temperature serves effectually to kill all germs of putrescence or any elements or property in the milk or cream promoting or tending to fermentation, putrefaction, and decomposition. The purpose of this pressure is to prevent formation of vapor and the avoidance of all ebullition in the can, because all boiling of milk or cream destroys its natural quality.

Fourth. The temperature is then reduced in the retort to 130° Fahrenheit; but the pressure of twenty-seven pounds is maintained to prevent the bursting of the can.

Fifth. The pressure is then relaxed and the cans run into cold water or otherwise suddenly cooled, and the product is ready for shipment.

Any suitable form of mechanism may be used in carrying out my process. The apparatus I have shown is as follows: A represents a reservoir containing milk, cream, or other material to be treated. 2 is a heater or sterilizer, over which cream, for example, is run. This sterilizer consists of a hollow corrugated structure, into which steam is admitted through the pipe 7. By means of the steam the cream is first heated to a temperature of approximately 130° Fahrenheit. This preliminary heating serves to destroy most of the germs, drive off undesired odors, and still leaves the natural quality of the cream unimpaired. 3 is a receiving-tank, into which the cream is then received, and from this tank it is run off through a spout 4 into cans or jars and sealed, still retaining approximately a temperature of 130° Fahrenheit. This sealing takes place under ordinary atmospheric pressure. B represents a retort having a door or opening 5 at one end capable of being hermetically sealed. In this retort the sealed product is placed and subjected to a further heating process by admitting steam to the retort. Steam is admitted through the perforated steam-passages 6 from the inlet-pipe 7. A suitable thermometer 8 and pressure-gage 9 are provided upon the retort. By means of the steam the temperature in the retort is gradually increased till at the end of fifteen minutes it is approximately 227°. Thus a pressure of twenty-seven pounds and temperature of 227° is maintained for about twenty minutes longer. This temperature of 227° serves effectually to kill all germs of putrescence or any elements or property in the milk or cream promoting or tending to fermentation, putrefaction, and decomposition. At the same time this temperature of 227° communicated to the milk or cream causes the latter to exert an outward pressure upon the interior of the jar or can, and the object of the proportionate increase in pressure in the retort—i. e., to twenty-seven pounds—is to counteract the pressure thus exerted by the heated contents. While the milk or cream is heated above the normal boiling-point, it is prevented from boiling by very reason of this pressure. The avoidance of ebullition is necessary that the preserve may retain its natural quality and flavor. Cold air is next admitted to the retort through the pipe 10, which connects with an air-compressor 11. The admission of the air to the retort is governed by a cock 12. While the pressure of twenty-seven pounds is still maintained the temperature is reduced by means of the cold air till at the end of about fifteen minutes it stands again in the retort at 130° Fahrenheit. This reduction of temperature in the retort has also served to cool the milk or cream somewhat and to have reduced its temperature to a point where the danger of the bursting of the can has been obviated. At the same time it has allowed the process of degerminization to have become completed without undue "cooking." The moment that this sterilization is fully effected any further submission of the product to the heat must be arrested. This sterilization is completed when, as stated, the retort is finally cooled to 130°. Immediately the door of the retort is then opened and the cans removed and plunged into cold water, the object of this sudden immersion being to deprive the milk or cream of its remaining heat as quickly as possible, for were it allowed to cool gradually it would deteriorate by undue cooking. It is this sealing at a temperature lower than the normal boiling-point of the milk or cream and the final degerminization of the sealed product at a point above the normal boiling-point, yet without allowing the milk or cream to boil or any natural flavors to escape, and then suddenly cooling it before it is allowed to unduly "cook" that distinguishes my process from those ordinarily in use and yields a product superior to any within my knowledge.

Having thus described my invention, what I claim as new, and desire to secure by Letters Patent, is—

1. A process for preserving cream and milk consisting of heating the cream or milk and sealing it at the same temperature; increasing the temperature to a degree above the normal boiling-point and at the same time maintaining an exterior pressure sufficient to prevent the formation of vapor and avoid ebullition in the can; and finally, suddenly cooling the sealed product.

2. A process for preserving cream and milk consisting of heating the cream or milk and sealing it at the same temperature; then gradually increasing the temperature until the normal boiling-point is exceeded, and at the same time maintaining an exterior pressure to prevent the formation of vapor and avoid ebullition in the can; then reducing the temperature; and, finally, suddenly cooling the sealed product.

3. A process for preserving milk or cream consisting of first heating and sterilizing the milk or cream at ordinary atmospheric pressure, second, sealing the product under the same temperature and pressure, third, heating it to an increased temperature, sufficient to destroy all germs, fourth, simultaneously with the increased temperature subjecting it further, at this temperature to an increased pressure, fifth, reducing the temperature while maintaining the increased pressure, and then reducing the pressure, and, finally, suddenly cooling the sealed substance.

In witness whereof I have hereunto set my hand.

ALGERNON VICTOR RUSSELL. [L. S.]

Witnesses:
JOHN B. RUSSELL,
HARRY J. LASK.